(12) United States Patent
Cottron et al.

(10) Patent No.: US 10,444,327 B2
(45) Date of Patent: Oct. 15, 2019

(54) METHOD FOR DETERMINING PARAMETERS OF A COMPRESSION FILTER AND ASSOCIATED MULTI-CHANNEL RADAR

(71) Applicant: THALES, Courbevoie (FR)

(72) Inventors: Rodolphe Cottron, Pessac (FR); Jean-Michel Hode, Pessac (FR)

(73) Assignee: THALES, Courbevoie (FR)

( * ) Notice: Subject to any disclaimer, the term of this patent is extended or adjusted under 35 U.S.C. 154(b) by 260 days.

(21) Appl. No.: 15/532,080

(22) PCT Filed: Nov. 10, 2015

(86) PCT No.: PCT/EP2015/076233
§ 371 (c)(1),
(2) Date: May 31, 2017

(87) PCT Pub. No.: WO2016/096250
PCT Pub. Date: Jun. 23, 2016

(65) Prior Publication Data
US 2017/0269195 A1 Sep. 21, 2017

(30) Foreign Application Priority Data

Dec. 19, 2014 (FR) ..................................... 14 02930

(51) Int. Cl.
| | |
|---|---|
| *G01S 7/40* | (2006.01) |
| *G01S 7/32* | (2006.01) |
| *G01S 13/28* | (2006.01) |
| *G01S 13/44* | (2006.01) |
| *G01S 7/292* | (2006.01) |

(52) U.S. Cl.
CPC ............. *G01S 7/4021* (2013.01); *G01S 7/32* (2013.01); *G01S 13/28* (2013.01); *G01S 13/44* (2013.01); *G01S 7/2921* (2013.01)

(58) Field of Classification Search
CPC .... G01S 7/4021; G01S 7/4052; G01S 7/4056; G01S 2007/406; G01S 2007/4069; G01S 2007/4073
See application file for complete search history.

(56) References Cited

U.S. PATENT DOCUMENTS

| | | | |
|---|---|---|---|
| 5,014,064 A | 5/1991 | Spencer et al. | |
| 5,160,933 A * | 11/1992 | Hager | G01S 7/4052 342/120 |

(Continued)

*Primary Examiner* — Peter M Bythrow
(74) *Attorney, Agent, or Firm* — Baker & Hostetler LLP

(57) ABSTRACT

A method for determining parameters of a finite impulse response pulse compression filter, implemented by a multi-channel radar comprises: a step Etp10 of transmitting a calibration signal and of acquiring this calibration signal after propagation through the transmission channel, a step Etp20 of injecting the signal acquired, at the input of each of the reception channels, a step Etp30 of measuring the signal at the output of each reception channel, a step Etp40 of calculating the transfer function of the matched filters on the basis of the signals at the output of the reception channels, a step Etp50 of measuring the value of the average power at the output of the various reception channels and of calculating the relative gains between each of the reception channels and a predetermined reception channel on the basis of the measured values of average powers.

8 Claims, 6 Drawing Sheets

(56) References Cited

U.S. PATENT DOCUMENTS

| | | | |
|---|---|---|---|
| 5,208,563 A | 5/1993 | Russell et al. | |
| 5,552,793 A * | 9/1996 | McLeod | G01S 7/4008 342/204 |
| 5,841,393 A * | 11/1998 | Saito | G01S 7/4056 342/165 |
| 6,067,043 A * | 5/2000 | Faure | G01S 7/4052 342/135 |
| 6,157,343 A * | 12/2000 | Andersson | H01Q 3/267 342/174 |
| 6,297,764 B1 * | 10/2001 | Wormington | G01S 7/2921 342/101 |
| 6,437,730 B1 * | 8/2002 | Orlandi | G01S 7/4004 342/122 |
| 6,476,759 B2 * | 11/2002 | Orlandi | G01S 7/4056 342/120 |
| 7,545,321 B2 * | 6/2009 | Kawasaki | H01Q 3/267 342/174 |
| 7,688,257 B1 * | 3/2010 | Christianson | G01S 13/30 342/131 |
| 7,724,182 B2 * | 5/2010 | Inoue | G01S 7/4004 342/165 |
| 8,193,972 B2 * | 6/2012 | Hofele | G01S 13/288 342/159 |
| 8,199,048 B1 * | 6/2012 | Medina Sanchez | G01S 7/4004 342/174 |
| 10,061,015 B2 * | 8/2018 | Breen | G01S 7/4004 |
| 10,164,334 B2 * | 12/2018 | Kareisto | H01Q 3/267 |
| 10,234,542 B2 * | 3/2019 | Subburaj | G01S 7/4004 |
| 2005/0190100 A1 * | 9/2005 | Hester | G01S 7/4004 342/174 |
| 2008/0012748 A1 * | 1/2008 | Ahn | H01Q 3/267 342/21 |
| 2010/0194626 A1 * | 8/2010 | Hofele | G01S 13/288 342/175 |
| 2012/0050094 A1 * | 3/2012 | Nakabayashi | G01S 7/03 342/174 |
| 2013/0016003 A1 * | 1/2013 | Stirling-Gallacher | H01Q 3/26 342/174 |
| 2014/0340254 A1 * | 11/2014 | Hesse | G01S 7/4008 342/173 |

* cited by examiner

METHOD FOR DETERMINING PARAMETERS OF A COMPRESSION FILTER AND ASSOCIATED MULTI-CHANNEL RADAR

CROSS-REFERENCE TO RELATED APPLICATIONS

This application is a National Stage of International patent application PCT/EP2015/076233, filed on Nov. 10, 2015, which claims priority to foreign French patent application No. FR 1402930, filed on Dec. 19, 2014, the disclosures of which are incorporated by reference in their entirety.

FIELD OF THE INVENTION

The present invention relates to the field of pulse compression. The present invention relates more particularly to a method for determining parameters of a compression filter, a method of pulse compression and an associated multi-channel radar.

BACKGROUND

Pulse compression is a signal processing technique used in the field of radar to increase the distance resolution of measurement as well as the signal-to-noise ratio. The general idea is to obtain a long pulse, so as to preserve sufficient energy on reception, without however sacrificing resolution relative to a short pulse of equivalent power.

Its principle is as follows: a signal is generated, whose temporal support is relatively long so as to maximize the transmitted energy. However, this signal is modulated in such a way that, after matched filtering, the inter-correlation between the signal received and the various frequencies of the transmitted signal makes it possible to resolve the return signals from several targets which might overlap inside the distance that the length of the pulse represents. As each part of the pulse has its own frequency, the returns arising from each target are completely separate.

In order to utilize the various channels of multi-channel radars, for example for monopulse processing, it is necessary to balance the gain and the phase of each of the reception channels. For narrowband radars for which it may be assumed that the response of the reception pathway is uniform in the instantaneous band, the measurement of differential gain and differential phase can be performed simply on the basis of a continuous wave (CW) reference signal reinjected on each transmission frequency at which the radar is required to work.

Within the framework of high-resolution radars, the gain can no longer be assumed to be constant over the instantaneous band of the radar and the compensation principle used in narrowband is no longer appropriate. Moreover, wideband radars generally use pulse compression waveforms, and the gain variation, in terms of amplitude and phase, inside the instantaneous band induces a degradation of the sidelobes at the output of the pulse compression processing intended to optimize the compromise between the probability of detection and the false alarm rate.

In the known solutions, it is generally sought to perform a linear processing by finite impulse response (FIR) filtering, with the aim of maximizing the probability of detection and of minimizing the false alarm rate. When the noise is white, it may be demonstrated that the achieving of these two optima amounts to maximizing the signal-to-noise ratio; in this case, the optimum, so-called matched, filter is that whose frequency response is the complex conjugate of the spectral density of the signal.

If the noise is not white, it will be considered that it is still sought to maximize the signal-to-noise ratio. It is then possible to reduce to the previous case by using a noise whitening filter beforehand, the matched filter then being the cascade of the two filters. However, the whitening filter is in general not achievable, since it is non-causal and of infinite duration. It is therefore only possible to have an approximation thereof.

The optimum (in terms of signal-to-noise) filter of finite dimension equal to that of the signal has response $\Gamma^{-1} s^*(-t)$ where $\Gamma$ is the restriction to the duration of the signal of the noise power correlation matrix. If the input noise in the reception pathway is white and if the duration of the signal were infinite then $\Gamma^{-1}$ would correspond to the inverse of the power response of the pathway, that is to say to the equalization in terms of power of the received signal. The duration being finite, $\Gamma^{-1}$ is merely the best finite approximation of this equalization (with respect to the signal-to-noise).

$\Gamma^{-1}$ is not measurable in practice on the basis of a measurement on noise. Moreover, the exact response of the transmitted signal is not known exactly either, since it comprises the defects introduced by the transmission pathway.

It is therefore sought to achieve an approximation of the operation described $\Gamma^{-1} s^*(-t)$ on the basis of an on-signal measurement (assumed reasonably devoid of noise by way of a coherent average).

Moreover, it is known that, in the case of dispersive pulses with linear frequency modulation, the signal obtained after matched filtering exhibits natural overshoots whose level (13 dB for the closest) may mask other targets. To reduce the level of these lobes, it is customary to weight the temporal response of the matched filter, this presenting the counterpart to degrading the signal-to-noise ratio. There is therefore a compromise between level of sidelobes and degradation of the signal-to-noise ratio SNR.

Finally, within the framework of multi-channel radars which comprise several independent reception pathways, it is fundamental that the responses of these pathways be identical both in amplitude and in phase. When the instantaneous band of the signal is low, the undulations in the response of the reception pathways remain very limited in the band so that these responses may be considered to be constant. It is then sought to equalize the responses with the aid of a differential gain and a differential phase. This is no longer true when the instantaneous band increases, above all when it is sought to use compact and selective filtering technologies (surface wave filters, ceramic filters, etc.), and the equalization must then take the form of a filtering. If the objective is to restore a flat response for each pathway, and if it is considered that the noise factor of the pathways occurs almost wholly at the head of the pathway, then this filtering corresponds to the whitening of the noise on the one hand and to a differential gain and a differential phase on the other hand.

For multi-channel high-resolution radars of the instantaneous wideband type, a Wiener filtering could be used to compensate the variations of complex gain in the band. The corresponding filter is obtained by calibration and applies to the totality of the temporal support considered. It consists in calculating the spectrum of the calibration signal as it exits the pathway, by discrete Fourier transform, and in inverting it. Applied to the useful signal containing the whole set of individual echoes of the radar, this filter yields, for each echo, a correlation spike of unit duration. This filter is therefore ideal, but it is non-causal and exhibits a temporal support at least equal to the duration of the useful signal, in general much greater than the duration of an individual echo. It therefore cannot, in particular, be embodied as an FIR, this nevertheless being imperative when the duration of the useful signal is very significant.

SUMMARY OF THE INVENTION

An aim of the invention is in particular to correct all or some of the drawbacks of the prior art by proposing a solution making it possible to obtain a finite impulse response pulse compression filter making it possible to take into account the various defects of the transmission and reception channels of a multi-channel radar in which it is implemented.

For this purpose, the subject of the invention is a method for determining the parameters of a pulse compression filter implemented by a multi-channel radar comprising a transmission channel and a plurality of reception channels, the signals arising from the reception channels being grouped together so as to form a sum channel and at least one difference channel, said filter being a finite impulse response filter and said parameters comprising matched filters and relative gains between reception channels, said method comprising:

A step Etp10 of transmitting a calibration signal and of acquiring this calibration signal after propagation through the transmission channel, A step Etp20 of injecting the signal acquired, at the input of each of the reception channels, A step Etp30 of measuring the signal at the output of each reception channel, A step Etp40 of calculating the transfer function of the matched filters on the basis of the signals at the output of the reception channels, A step Etp50 of measuring the value of the average power at the output of the various reception channels and of calculating the relative gains $\gamma_i$ between each of the reception channels and a predetermined reception channel on the basis of said measured values of average powers.

According to an implementation variant, the matched filters are defined by:

$$\begin{cases} H_s(F) = \dfrac{W(F)}{C_s(F)} \cdot \sqrt{\sum W(F) \cdot |C_s(F)|^2} \\ H_d(F) = \dfrac{W(F)}{C_d(F)} \cdot \sqrt{\sum W(F) \cdot |C_d(F)|^2} \end{cases}$$

where W(F) represents a weighting law defined in the frequency domain;

Cs(F) and Cd(F) represent respectively the spectrum of the calibration signal, after passing through the transmission (Tx) and reception (Rx) channels, for the sum channel and a difference channel.

According to an implementation variant, the method furthermore comprises a step Etp35 of averaging the signal acquired at the output of each reception channel so as to improve the signal-to-noise ratio.

According to an implementation variant, the weighting law W(F) is smoothed.

According to an implementation variant, the values of relative gains $\gamma_i$ are integrated into the expression for the matched filters ($H_d$) of the difference channels.

The subject of the invention is also a method of pulse compression, implemented by a multi-channel radar comprising a transmission channel and a plurality of reception channels, the signals arising from the reception channels being grouped together so as to form a sum channel and at least one difference channel, said radar comprising at least one memory area in which are stored the parameters of a pulse compression filter determined by the above-described method for determining parameters, said pulse compression being performed, for the sum channel, by multiplying the spectrum of the signal S(F) at the output of the sum channel by the transfer function of the matched filter $H_s(F)$ corresponding to the sum channel and for a difference channel, by multiplying the spectrum of the signal D(F) at the output of a difference channel by the transfer function of the matched filter $H_d(F)$ corresponding to the difference channel considered and by the value of the relative gain $\gamma_i$ corresponding to the difference channel considered.

According to an implementation variant, the values of relative gains $\gamma_i$ are integrated into the expression for the matched filters ($H_d$) of the difference channels and the pulse compression, for a difference channel, being performed by multiplying the spectrum of the signal D(F) at the output of a difference channel by the transfer function of the matched filter $H_d(F)$ corresponding to the difference channel considered.

The subject of the invention is also a multi-channel radar comprising a transmission channel and a plurality of reception channels, the transmission channel comprising a coupler connected at the output of said transmission channel, said coupler being configured to tap off a part of the signal at the output of the transmission channel and reinject it at the input of each reception channel and in that it comprises at least one calculation module able to implement the method described above to calculate parameters of a pulse compression filter on the basis of the signal reinjected in the reception channels and at least one pulse compression module able to implement the above method of pulse compression.

BRIEF DESCRIPTION OF THE DRAWINGS

Other features and advantages of the present invention will be more clearly apparent on reading the description hereinafter, given by way of nonlimiting illustration with reference to the appended drawings, in which:

FIG. 9b represents a zoom of the curves of FIG. 9a.

DETAILED DESCRIPTION

Figure 1:
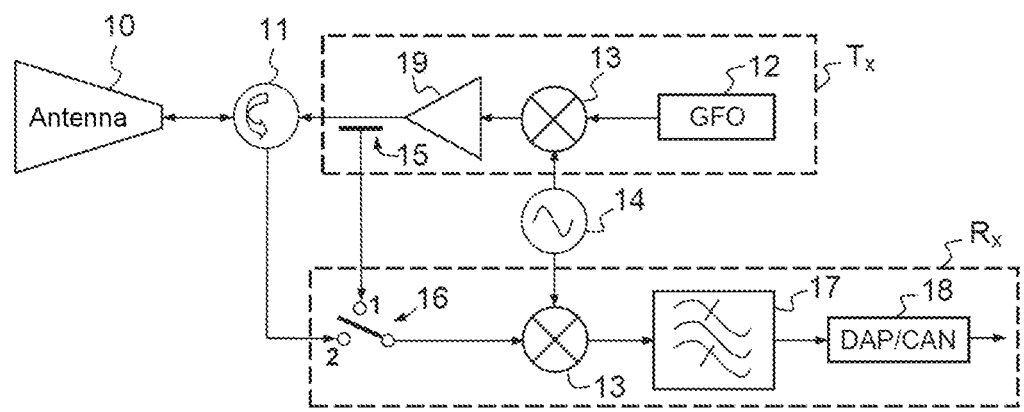
FIG. 1 represents a simplified schematic of a radar for a reception channel.

FIG. 1 represents a simplified schematic of a radar. In order not to overload the figure, just one transmission and reception channel has been represented. This example is wholly non-limiting and can be generalized to the case of a multi-channel radar comprising a plurality of reception channels.

An antenna 10 is connected to a circulator 11 itself connected to a transmission channel Tx and a reception channel Rx. The transmission channel can comprise a waveform generator 12 generating baseband signals which will thereafter be modulated by way of a mixer 13, with the aid of carrier frequencies generated by the frequency source 14. The signal at the output of the mixer 13 is thereafter amplified by an amplifier 14. A coupler 15, connected to the output of the amplifier 14, makes it possible to tap off a part of the amplified signal and to redirect the latter to a switch 16 placed at the input of the reception pathway Rx. In this example this switch 16 comprises two positions. A first position, referenced 1 in the figure, makes it possible to inject the signal at the output of the transmission channel, by way of the coupler 15, at the input of the reception pathway Rx. This position serves for the calibration of the radar and makes it possible to calculate the parameters of the pulse compression filter. The second position, referenced 2, serves for the normal use of the radar and makes it possible to direct the signal originating from the antenna 10 toward the reception pathway Rx. The reception pathway can comprise a mixer 13 making it possible to transpose the signal with the aid of the carrier generated by the frequency source 14. The signal is thereafter filtered through a filter 17 and is then demodulated and converted into a digital signal with the aid of an Amplitude Phase Demodulator and of an Analogic Digital Converter (or DAP/CAN) 18.

The signals arising from the reception channels (Rx) are grouped together according to recombining techniques known to the person skilled in the art, to form a sum channel and at least one difference channel.

The operational signals received by the antenna 10 can be modeled by the expressions:

$$\begin{cases} S = K \cdot G_s(\theta) \cdot \sqrt{RCS} \cdot e^{i\varphi_s} \cdot A_s(t) \otimes p(t) \\ D = K \cdot G_d(\theta) \cdot \sqrt{RCS} \cdot e^{i\varphi_d} \cdot A_d(t) \otimes p(t) \end{cases}$$

Likewise the calibration signals can be modeled by:

$$\begin{cases} C_s = B \cdot e^{i\varphi_s} \cdot A_s(t) \otimes p(t) \\ C_d = B \cdot e^{i\varphi_d} \cdot A_d(t) \otimes p(t) \end{cases}$$

where:
B, represents the amplitude, assumed unknown, of the calibration signal;
p(t), represents the radar pulse of duration T such that $|p(t)|=1$ for $0<t<T$;
$A_s(t)$, represents the impulse response of the pathway of the Sum channel of the radar;
$A_d(t)$, represents the impulse response of the pathway of one of the Difference channels of the radar;
K, represents a constant originating from the radar equation;
$G_s(\theta)$ and $G_d(\theta)$, represents the complex gain, assumed independent of frequency, of the antenna in the direction $\theta$;
RCS, represents the Radar Cross Section of a target;
$\varphi_s$ and $\varphi_d$ represent the phase errors of the pathway for the Sum and Difference channels;
$\otimes$, represents the convolution operator.

By performing a Fourier transform on each of these signals, we obtain:

$$\begin{cases} S(F) = K \cdot G_s(\theta) \cdot \sqrt{RCS} \cdot e^{i\varphi_s} \cdot A_s(F) \cdot P(F) \\ D(F) = K \cdot G_d(\theta) \cdot \sqrt{RCS} \cdot e^{i\varphi_d} \cdot A_d(F) \cdot P(F) \end{cases}$$

and $$\begin{cases} C_s(F) = B \cdot e^{i\varphi_s} \cdot A_s(F) \cdot P(F) \\ C_d(F) = B \cdot e^{i\varphi_d} \cdot A_d(F) \cdot P(F) \end{cases}$$

where $A_S(F)$ and $A_D(F)$ respectively represent the complex gains of the Sum and Difference channels.

The weighted and normalized matched filters (independent of the calibration level B) for each of the channels can be defined by:

$$\begin{cases} H_s(F) = \dfrac{W(F)}{C_s(F)} \cdot \sqrt{\sum W(F) \cdot |C_s(F)|^2} \\ H_d(F) = \dfrac{W(F)}{C_d(F)} \cdot \sqrt{\sum W(F) \cdot |C_d(F)|^2} \end{cases}$$

where W(f) is any weighting law defined in the spectral domain, such as for example a Blackman law, a Hanning law, a Hamming law, Taylor law or any other equivalent law as well as any combination of laws that are known to the person skilled in the art.

In order to limit the Gibbs phenomena, that is to say the temporal overshoots related to the abrupt truncation of the spectrum, this spectral weighting law can be smoothed so as to attenuate the discontinuity at the transition between the useful band and the off-band area. This smoothing can be obtained, for example, by applying, to the weighting W(f), a convolution with another weighting window, such as for example and in a nonlimiting manner, a Hanning window, but of much shorter length than W(f). This length can for example be of the order of $\frac{1}{32}^{nd}$ or $\frac{1}{64}^{th}$ of the length of W(f).

The relative gains $\gamma$ can be defined by:

$$\gamma = \frac{\sqrt{\sum W(F) \cdot |C_s(F)|^2}}{\sqrt{\sum W(F) \cdot |C_d(F)|^2}} = \frac{\sqrt{\sum W(F) \cdot |A_s(F) \cdot P(F)|^2}}{\sqrt{\sum W(F) \cdot |A_d(F) \cdot P(F)|^2}}$$

The pulse compression can be carried out, for the Sum channel, by performing:

$$CI_s(F) = S(F) \cdot H_s(F) =$$

$$K \cdot G_s(\theta) \cdot \sqrt{RCS} \cdot W(F) \cdot \frac{\sqrt{\sum W(F) \cdot |C_s(F)|^2}}{B} \Rightarrow CI_s(F) =$$

$$K \cdot G_s(\theta) \cdot \sqrt{RCS} \cdot W(F) \cdot \sqrt{\sum W(F) \cdot |A_s(F) \cdot P(F)|^2}$$

In the same manner, for the Difference channels, we can calculate:

$$CI_d(F) = \gamma \cdot D(F) \cdot H_d(F) = K \cdot G_d(\theta) \cdot \sqrt{RCS} \cdot W(F) \cdot \sqrt{\sum W(F) \cdot |A_s(F) \cdot P(F)|^2}$$

where $Ci_s(F)$ and $Ci_d(F)$ represent the spectrum of the compressed signal respectively for the Sum channel and for a Difference channel.

The compressed signal is obtained by performing the inverse Fourier transform on the signals $CI_s(F)$ and $CI_d(F)$.

As a function of the practical choices of implementation, a variant can consist in taking into account the relative gains γ directly in the expression for the filter $H_d(F)$ thereby making it possible to simplify the expression for the pulse compression which becomes: $CI_d(F) = D(F) \cdot Hd(F)$.

On completion of these operations, it may be noted that the sidelobes are controlled since it is the theoretical response which is yielded; $CI_s(F)$ and $CI_d(F)$ do not depend on the impulse responses $A_s(F)$, $A_d(F)$ of the pathway of the sum and difference channels of the radar.

Because a filter whose shape is $1/S(F)$, where $S(F)$ represents the spectrum of the signal, is applied to the signal, the output produced is a spectral rectangle of width of the frequency band that is processed. The inverse transform of this signal is a cardinal sine signal. Applying a weighting in the filter produces a weighted cardinal sine. The choice of the weighting window will therefore make it possible to control the sidelobe levels.

It may also be noted that there is no differential gain between the Sum and Difference channels, to within the antenna gain, thereby making it possible to calculate the angular offset measurements (monopulse technique): the amplitude compensation is performed via the relative gains γ and the phase compensation being obtained naturally on principle since the phase of each channel is reduced to zero by applying the matched filters $H_s$ and $H_d$.

Figure 2:
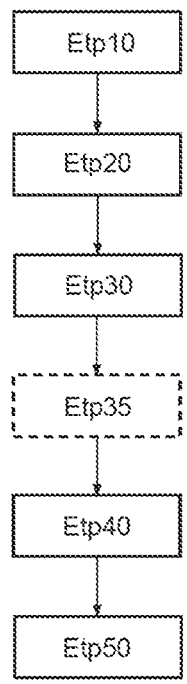
FIG. 2 represents possible steps of the method according to the invention.

FIG. 2 illustrates possible steps of the method for determining parameters of a pulse compression filter according to the invention.

The parameters of the compression filter can comprise the filter $H_s$ matched to the sum channel, the filters $H_d$ matched to the difference channel and the relative gains $\gamma_i$ between a predetermined reception channel chosen as reference channel and each of the other reception channels.

A calibration signal is transmitted by a generator of the transmission channel Tx in the course of a step Etp10. This signal is thereafter acquired at the output of the transmission channel Tx. This makes it possible to measure, in addition to the signal transmitted, all the defects related to the various components of the transmission pathway Tx.

The signal acquired is thereafter injected at the input of each reception channel Rx in the course of a step Etp20. After having passed through the reception pathway, the signals are thereafter measured at the output of each reception pathway Rx during a step Etp30.

In order to improve the signal-to-noise ratio, the method can comprise a step Etp35 of averaging the signal at the output of each reception channel.

The method thereafter comprises a step Etp40 of calculating the transfer function of the weighted and normalized matched filters $H_s$, $H_d$, for each of the channels on the basis of the signals measured at the outputs of each reception channel Rx. The transfer function of these matched filters for the sum channel $H_s$ and for a difference channel $H_d$ can be defined by:

$$\begin{cases} H_s(F) = \dfrac{W(F)}{C_s(F)} \cdot \sqrt{\sum W(F) \cdot |C_s(F)|^2} \\ H_d(F) = \dfrac{W(F)}{C_d(F)} \cdot \sqrt{\sum W(F) \cdot |C_d(F)|^2} \end{cases}$$

where W(f) represents any weighting law defined in the frequency domain;
Cs(F) and Cd(F) represent the calibration signal in the frequency domain, after passing through the transmission and reception channels, respectively for the sum channel and a difference channel.

In this expression for the pulse-matched filters $H_s$, $H_d$, it is noted that the shape of a Wiener filter is retrieved through the term $$\frac{1}{C_s(F)}$$

which corresponds to the inverse of the calibration signal.

By expanding the expression for the filters, it may be shown that these filters $H_s$, $H_d$ are independent of the level of the calibration signal.

In an advantageous manner, the choice of the weighting law makes it possible to control the sidelobes. Any dependency on the defects of the transmission and reception pathways being eliminated, the sidelobes will depend only on the choice of weighting law. This weighting law or weighting window is chosen as a function of the application and of the necessary level. By way of example, if lobes of −13 dB are tolerated, a rectangular window may be chosen. If lower levels are desired, it will be possible to choose for example a Hanning, Hamming or Taylor weighting or any other weighting law, or combination of laws, which is known to the person skilled in the art.

The pulse compression is carried out on a multi-channel radar. A problem is that each reception channel has different defects related to hardware dispersion. In order to be able to undertake multi-channel radar processings such as for example offset measurement, monopulse processings, it is necessary to inter-balance the various reception channels. The method therefore comprises a step of balancing the reception channels Rx so as to control the relative gains between channels.

For this purpose, the method comprises a step Etp50 of measuring the relative gains between the various reception channels Rx. A reception channel is taken as reference and, on the basis of the average power measured at the output of each reception channel, the value of the relative gains $\gamma_i$ between each reception channel Rx and the reception channel taken as reference channel is measured. These relative gains $\gamma_i$ are the gains of the reception channel Rx independently of the antenna 10 of the radar.

These various parameters of the pulse compression filter can, for example, be recorded in a memory area of the radar so that they can be reused.

In an advantageous manner, the calibration phase for a radar according to the invention does not require any means outside the radar (on-board or on-line calibration) and makes it possible to circumvent the temperature variations during the use of the radar or the replacement of a component electronic card of the radar pathway. This calibration can be carried out in a periodic or aperiodic manner.

The method for determining pulse compression filter parameters according to the invention can be implemented by one or more calculation modules of the radar. Likewise, the pulse compression can be implemented by a calculation module, for example a pulse compression module, dedicated or not. These modules may be one or more microprocessors, processors, computers or any other equivalent means programmed in an opportune manner.

Figure 3A:
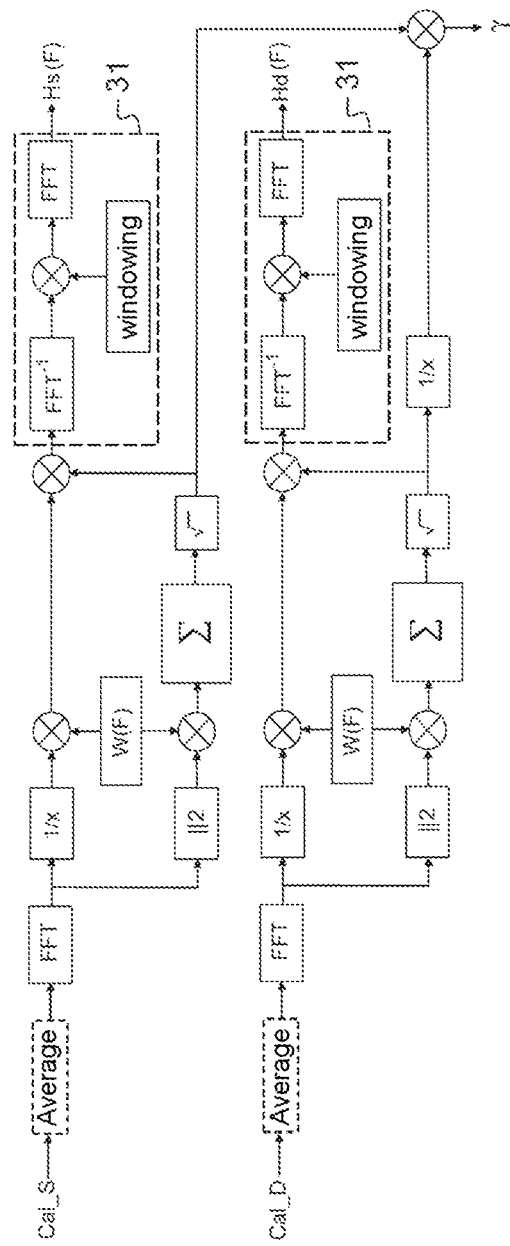
FIGS. 3a and 4a represent two examples of carrying out the processing to determine the parameters of the pulse compression filter according to the invention.
Figure 4A:
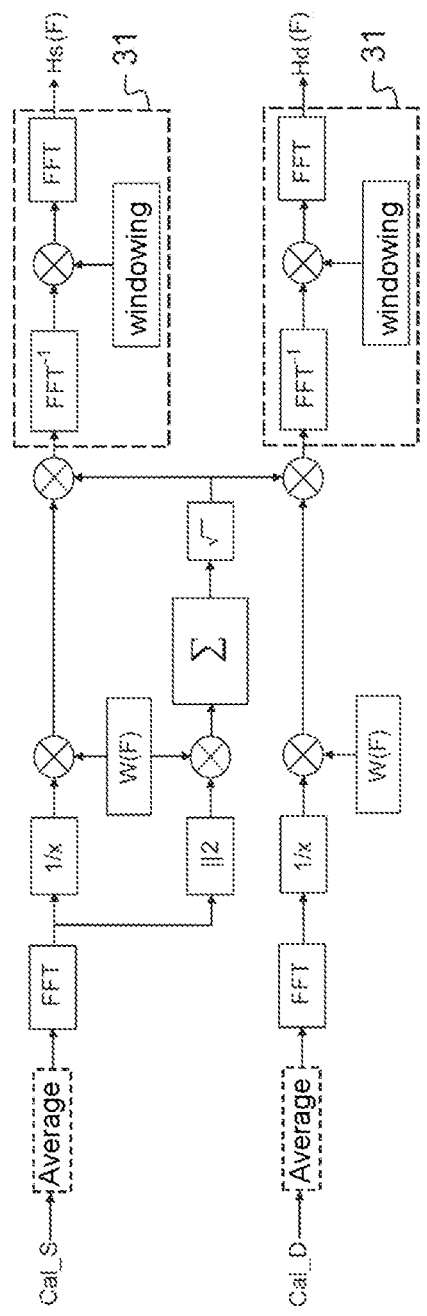

FIGS. 3a and 4a represent two examples of carrying out the processing to determine parameters of the pulse compression filter according to the invention on the basis of the calibration signals of the sum channel Cal_S and of a difference channel Cal_D. The figure represents only one difference channel but the processing can be generalized to the case where several difference channels might be present.

In the processing illustrated in FIG. 3a, the pulse-matched filters $H_s$ and $H_d$ and the relative gains $\gamma$ are calculated separately.

FIG. 4a represents a variant embodiment in which the relative gains $\gamma_i$ are integrated directly into the expression for the matched filters of the difference channels $H_d$.

In the two embodiments, a windowing operation 31 is applied to the pulse-matched filters $H_s$ and $H_d$ so that the filter is a finite-duration filter. This windowing operation 31 consists in performing a transposition of the signal into the time domain with the aid of an inverse Fourier transform, in multiplying the signal obtained by a time window and in retransposing the signal into the frequency domain.

Figure 3B:
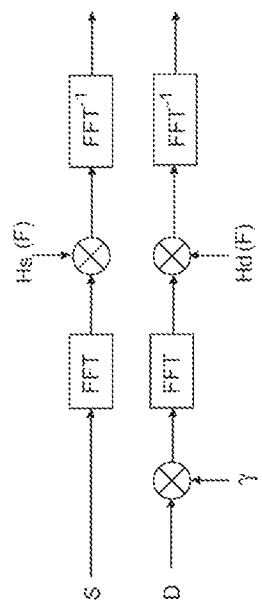
FIGS. 3b and 4b represent two examples of modes of implementation of the pulse compression filter according to the invention.
Figure 4B:
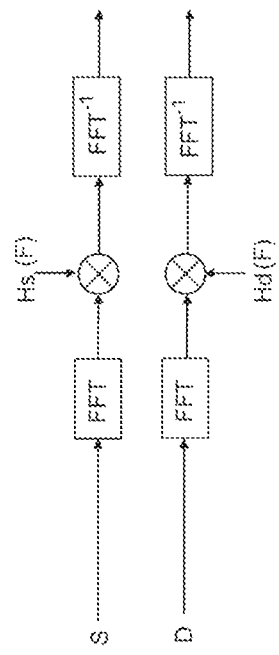

FIGS. 3b and 4b represent two examples of modes of implementation of the pulse compression filters, the determination of whose parameters is illustrated respectively in FIGS. 3a and 4a.

In the embodiment of FIG. 3b, the temporal signal S arising from the sum channel undergoes a Fourier transform, is multiplied by the filter $H_s(F)$ and then undergoes an inverse Fourier transform to return to the time domain.

The temporal signal D arising from each difference channel is multiplied by the relative gain $\gamma$ corresponding to the difference channel considered, undergoes a Fourier transform, is multiplied by the matched filter $H_d(F)$ corresponding to the difference channel considered and is then transposed into the time domain by way of an inverse Fourier transform.

In the embodiment of FIG. 4b, the relative gain $\gamma$ corresponding to the difference channel considered being integrated into the expression for the matched filter of the difference channel $H_d(F)$, the temporal signal D arising from each difference channel is only multiplied by the matched filter $H_d(F)$ corresponding to the difference channel considered after having been transposed into the frequency domain by a Fourier transform. It will thereafter undergo an inverse Fourier transform to return to the time domain.

Figure 5:
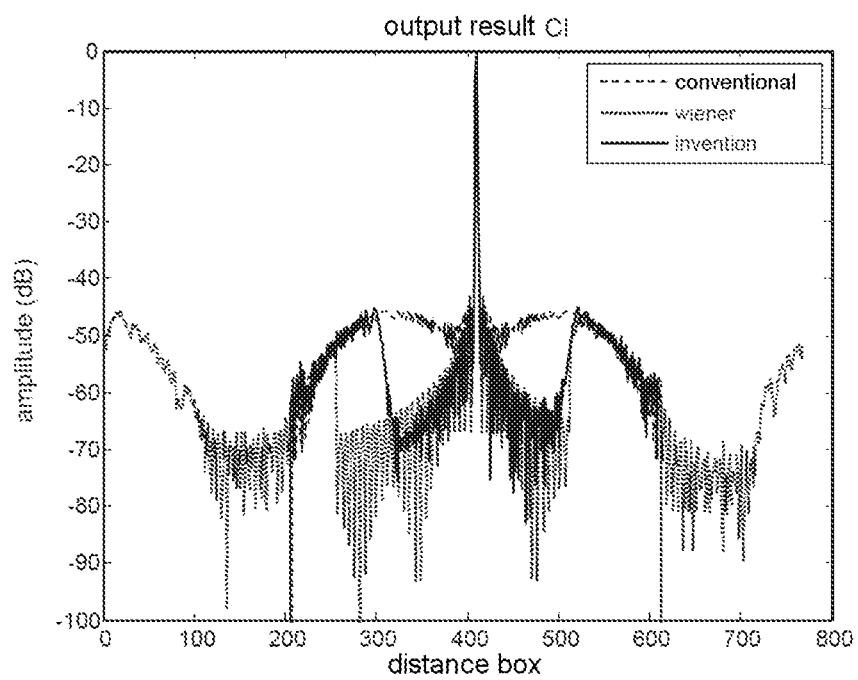
FIG. 5 represents results obtained as pulse compression output with the aid of various filters.
Figure 9A:
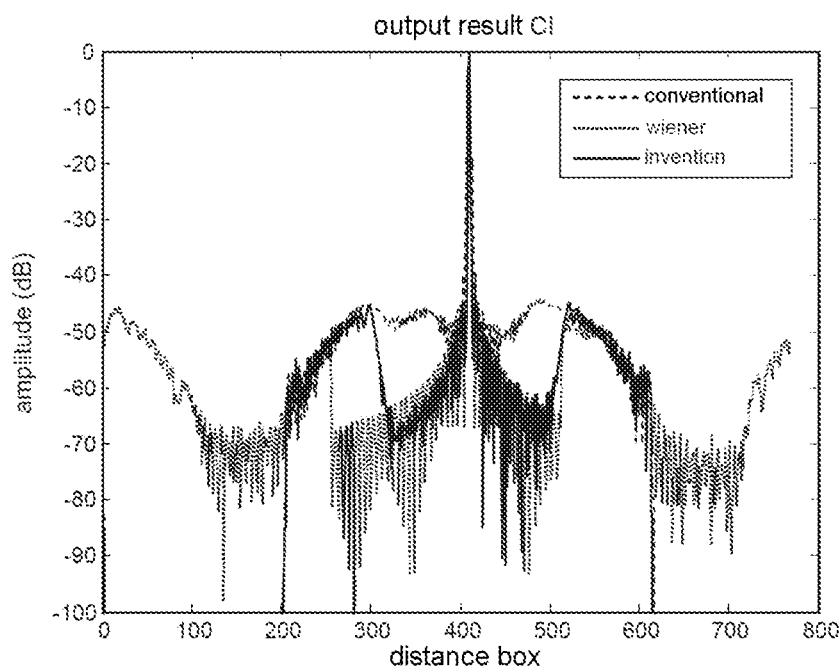
FIG. 9a represents the results obtained as pulse compression output with the filters of FIG. 8.
Figure 9B:
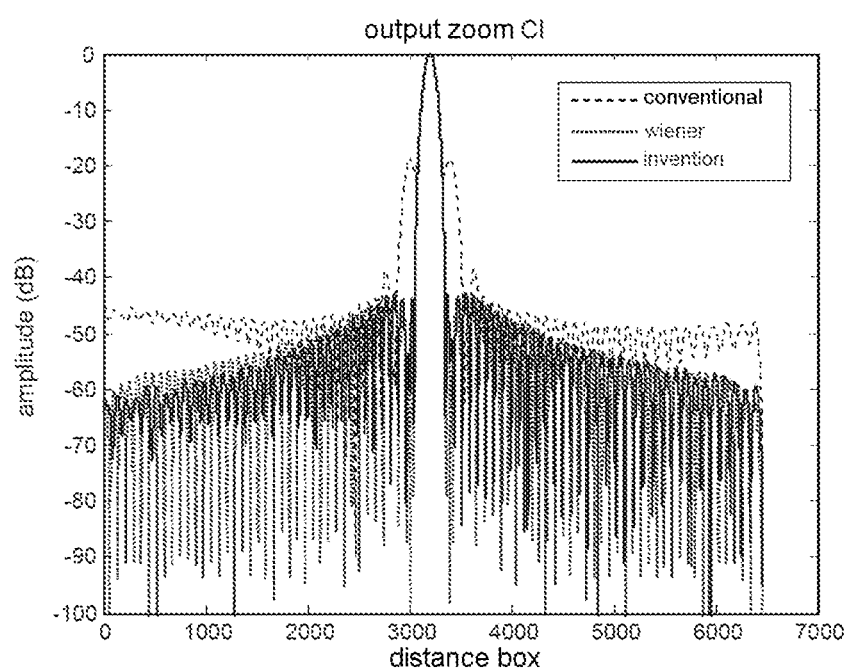

FIGS. 5 and 9a, 9b illustrate examples of results obtained by applying a compression filter according to the invention.

FIG. 5 represents the results obtained as pulse compression output with a conventional compression filter, a Wiener filter and the compression filter according to the invention in the case of a transmission Tx and reception Rx pathway not exhibiting any defect.

Figure 6:
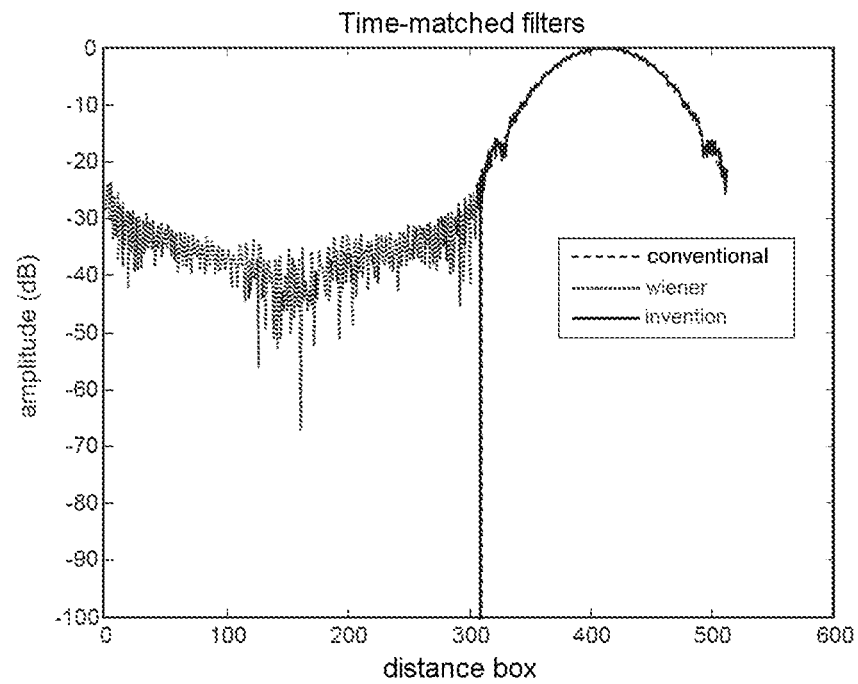
FIG. 6 represents the temporal shapes of the matched filters used.

FIG. 6 represents the temporal shape of the filters used.

Figure 7:
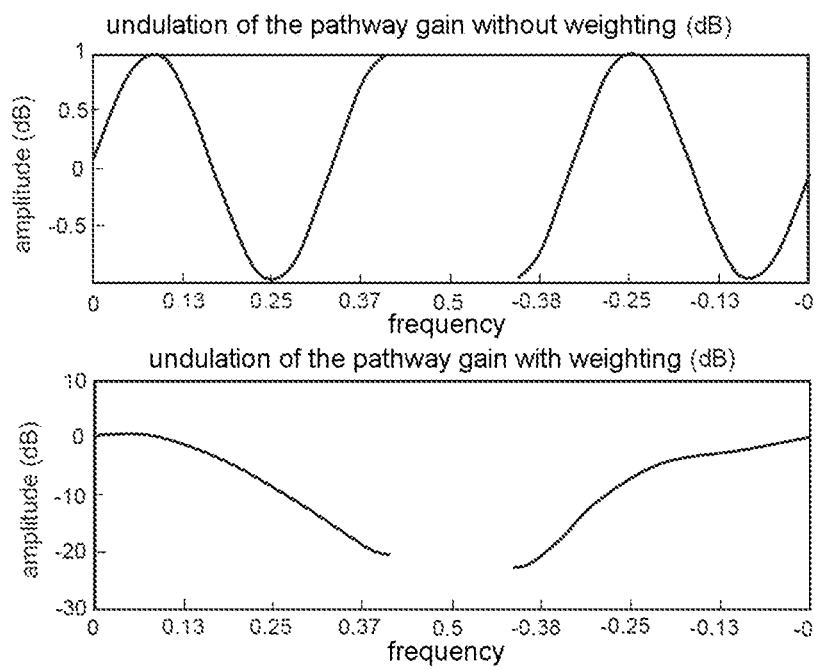
FIG. 7 represents examples of defects of variation of amplitude in the transmission pathway.
Figure 8:
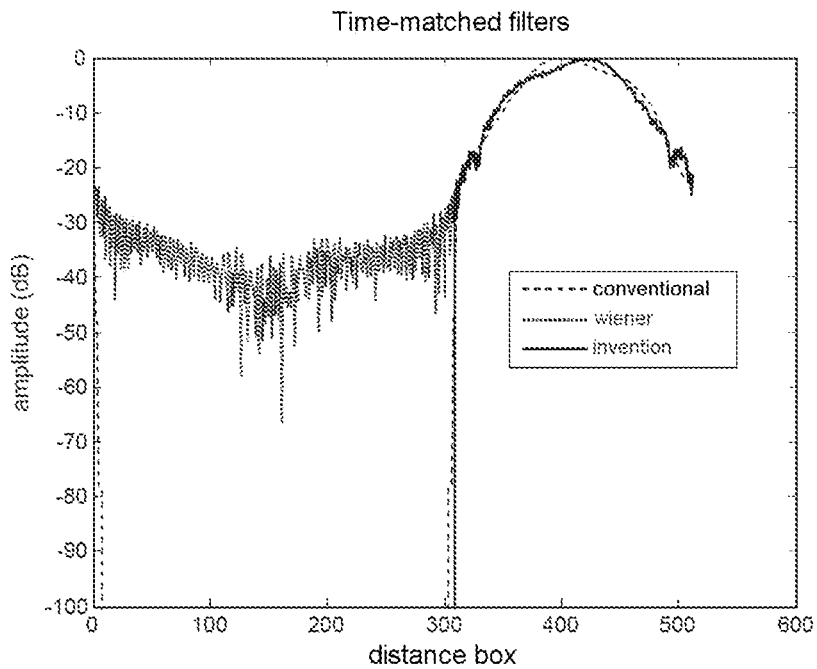
FIG. 8 represents the temporal shape of the matched filters used.

FIG. 7 is a graphical representation of defects of the transmission Tx and reception Rx channels. These defects are essentially variations of amplitude. FIG. 8 presents the temporal shape of the matched filters used.

As previously, FIG. 9a compares the results obtained as pulse compression output with the conventional and Wiener filters and that according to the invention. FIG. 9b is a zoom of FIG. 9a around the main lobe.

In FIG. 9b, it is noted that the use of the conventional matched filter amplifies the errors introduced by the transmission and reception pathways. FIG. 9a shows that if the Wiener filter is applied, an inherent main lobe is obtained but a tailoff with upswings is observed.

The use of the filter according to the invention makes it possible to obtain as pulse compression output at one and the same time control of the main lobe and control of the lobes of the pulse compression without having any tailoff. One obtains the levels that one would have with a conventional matched filter in the absence of spectral deformation by the reception pathway.

An advantage of the invention is in particular to make it possible to obtain a short temporal response allowing an embodiment of FIR type, an embodiment particularly well suited to implementation on a programmable logic circuit such as for example an FPGA.

Another advantage of the invention is that it uses a radar signal replica recorded during a radar calibration phase undertaken in an autonomous manner by the radar, without needing any means outside the radar and without needing to perform a specific factory calibration on each item of hardware.

The invention claimed is:

1. A method for determining parameters of a pulse compression filter, implemented by a multi-channel radar comprising a transmission channel and a plurality of reception channels, the signals arising from the reception channels being grouped together so as to form a sum channel and at least one difference channel, said filter being a finite impulse response filter and said parameters comprising matched filters and relative gains between reception channels, said method lacing comprising:
    a step Etp10 of transmitting a calibration signal and of acquiring this calibration signal after propagation through the transmission channel,
    a step Etp20 of injecting the signal acquired, at the input of each of the reception channels,
    a step Etp30 of measuring the signal at the output of each reception channel,
    a step Etp40 of calculating the transfer function of the matched filters on the basis of the signals at the output of the reception channels,
    a step Etp50 of measuring a value of the average power at the output of the various reception channels and of calculating the relative gains $\gamma_i$ between each of the reception channels and a predetermined reception channel on the basis of said measured values of average powers.

2. The method as claimed in claim 1, wherein the matched filters ($H_s$, $H_d$) are defined by:

$$\begin{cases} H_s(F) = \dfrac{W(F)}{C_s(F)} \cdot \sqrt{\sum W(F) \cdot |C_s(F)|^2} \\ H_d(F) = \dfrac{W(F)}{C_d(F)} \cdot \sqrt{\sum W(F) \cdot |C_d(F)|^2} \end{cases}$$

where W(F) represents a weighting law defined in the frequency domain;
Cs(F) and Cd(F) represent respectively the spectrum of the calibration signal, after passing through the transmission and reception channels, for the sum channel and a difference channel.

3. The method as claimed in claim 1, wherein the method furthermore comprises a step Etp35 of averaging the signal acquired at the output of each reception channel so as to improve the signal-to-noise ratio.

4. The method as claimed in claim 2, wherein the weighting law W(F) is smoothed.

5. The method as claimed in claim 2, wherein values of relative gains $\gamma_i$ are integrated into a mathematical model for the matched filters, comprising transfer functions ($H_s$, $H_d$), of the difference channels.

6. A method of pulse compression, implemented by a multi-channel radar comprising a transmission channel and a plurality of reception channels, the signals arising from the reception channels being grouped together so as to form a sum channel and at least one difference channel, said radar comprising at least one memory area in which are stored the parameters of a pulse compression filter determined by the method for determining parameters as claimed in claim 1, said method of pulse compression wherein said pulse compression is performed, for the sum channel, by multiplying the spectrum of the signal S(F) at the output of the sum channel by the transfer function of the matched filter $H_s(F)$ corresponding to the sum channel and for a difference channel, by multiplying the spectrum of the signal D(F) at the output of a difference channel by the transfer function of the matched filter $H_d(F)$ corresponding to the difference channel considered and by a value of the relative gain $\gamma_i$ corresponding to the difference channel considered.

7. The method as claimed in claim 6, in which the parameters of a pulse compression filter are determined such that the values of relative gains $\gamma_i$ are integrated into a mathematical model for the matched filters, comprising transfer functions ($H_s$, $H_d$), of the difference channels, the pulse compression, for a difference channel, being performed by multiplying the spectrum of the signal D(F) at the output of a difference channel by the transfer function of the matched filter $H_d(F)$ corresponding to the difference channel considered.

8. A multi-channel radar comprising a transmission channel and a plurality of reception channels, said radar wherein the transmission channel comprises a coupler connected at the output of said transmission channel, said coupler being configured to tap off a part of the signal at the output of the transmission channel (Tx) and reinject it at the input of each reception channel and comprising at least one calculation module able to implement the method as claimed in claim 1 to calculate parameters of a pulse compression filter on the basis of the signal reinjected in the reception channels and at least one pulse compression module able to implement a method of pulse compression, implemented by the multi-channel radar comprising the transmission channel and the plurality of reception channels, the signals arising from the reception channels being grouped together so as to form a sum channel and at least one difference channel, said radar comprising at least one memory area in which are stored the parameters of a pulse compression filter determined by the method for determining parameters as claimed in claim 1, said method of pulse compression wherein said pulse compression is performed, for the sum channel, by multiplying the spectrum of the signal S(F) at the output of the sum channel by the transfer function of the matched filter $H_s(F)$ corresponding to the sum channel and for a difference channel, by multiplying the spectrum of the signal D(F) at the output of a difference channel by the transfer function of the matched filter $H_d(F)$ corresponding to the difference channel considered and by a value of the relative gain $\gamma_i$ corresponding to the difference channel considered.

\* \* \* \* \*